United States Patent
Saito et al.

(10) Patent No.: US 7,481,850 B2
(45) Date of Patent: Jan. 27, 2009

(54) SOLID ELECTROLYTIC CAPACITOR, STACKED CAPACITOR USING THE SAME, AND FABRICATION METHOD THEREOF

(75) Inventors: Takeshi Saito, Sendai (JP); Sadamu Toita, Sendai (JP); Katsuhiro Yoshida, Sendai (JP)

(73) Assignee: NEC Tokin Corporation, Tokyo (JP)

( * ) Notice: Subject to any disclaimer, the term of this patent is extended or adjusted under 35 U.S.C. 154(b) by 130 days.

(21) Appl. No.: 11/686,764

(22) Filed: Mar. 15, 2007

(65) Prior Publication Data

US 2007/0159771 A1 Jul. 12, 2007

Related U.S. Application Data

(62) Division of application No. 11/157,524, filed on Jun. 21, 2005, now Pat. No. 7,215,534.

(30) Foreign Application Priority Data

Jul. 22, 2004 (JP) ............................. 2004-214344

(51) Int. Cl.
*H01G 9/04* (2006.01)
*H01G 9/145* (2006.01)
(52) U.S. Cl. ..................... 29/25.03; 361/528; 361/534
(58) Field of Classification Search ................ 29/25.03; 361/528, 532
See application file for complete search history.

(56) References Cited

U.S. PATENT DOCUMENTS

| 6,865,070 | B2 | 3/2005 | Arai et al. |
| 7,215,534 | B2* | 5/2007 | Saito et al. ................. 361/528 |
| 2004/0052032 | A1* | 3/2004 | Monden et al. ............. 361/523 |
| 2004/0085712 | A1* | 5/2004 | Tadanobu et al. ........... 361/523 |
| 2005/0105250 | A1* | 5/2005 | Kobayashi ................. 361/523 |
| 2006/0109609 | A1* | 5/2006 | Kobayashi et al. .......... 361/523 |

FOREIGN PATENT DOCUMENTS

| JP | 05-326343 A | 12/1993 |
| JP | 2001-358039 A | 12/2001 |
| JP | 2004-087872 A | 3/2004 |

* cited by examiner

*Primary Examiner*—Alexander G Ghyka
(74) *Attorney, Agent, or Firm*—Frishauf, Holtz, Goodman & Chick, P.C.

(57) ABSTRACT

On a surface-roughened aluminum foil, an aluminum oxide film as an anodic oxide film is formed. Then, a conductive polymer layer as a solid electrolyte is formed thereon and thereafter a first metal plating layer is directly formed on the conductive polymer layer, thereby forming a cathode portion. On the other hand, a second metal plating layer is formed on another portion of the surface-roughened aluminum foil, which is not subjected to anodic oxidation or which is subjected to anodic oxidation followed by polishing or formation of an anode deposition film, to thereby form an anode portion. Third metal plating layers are formed at the anode and the cathode portions to obtain a capacitor element. A plurality of capacitor elements are stacked and bonded together fusion after formation of the third metal plating layers. Alternatively the capacitor elements may be bonded together by conductive paste without the third metal layers.

22 Claims, 9 Drawing Sheets

SOLID ELECTROLYTIC CAPACITOR, STACKED CAPACITOR USING THE SAME, AND FABRICATION METHOD THEREOF

The present application is a Divisional Application of U.S. application Ser. No. 11/157,524 filed Jun. 21, 2005, now U.S. Pat. No. 7,215,534, which claims priority to prior Japanese patent application JP 2004-214344, the disclosure of both of which is incorporated herein by reference.

BACKGROUND OF THE INVENTION

This invention relates to a thin-type aluminum solid electrolytic capacitor using a single-plate aluminum foil and, more specifically, relates to a capacitor fabrication method that directly forms a metal plating layer without a pretreatment at a cathode portion and then forms a metal plating layer at an anode portion to thereby realize low impedance characteristics at high frequencies and achieve an increase in capacity with stacked layers.

In recent years, following miniaturization, speed-up, and digitization of electronic devices, there has been a strong demand for small-size, large-capacity, and low-impedance capacitors having excellent high-frequency characteristics also in the field of capacitors.

Capacitors that are used in a high frequency region have conventionally been mainly multilayer ceramic capacitors which, however, cannot satisfy need for reduction in size, increase in capacity, and reduction in impedance.

As large-capacity capacitors, there are electrolytic capacitors such as conventional aluminum electrolytic capacitors and tantalum solid electrolytic capacitors. Liquid or solid electrolyte used in those capacitors, for example, manganese dioxide, has a high resistivity value of 1 $\omega \cdot cm$ to 100 $\omega \cdot cm$ and therefore it has been difficult to obtain a capacitor having a sufficiently low impedance in a high frequency region.

In recent years, however, there have been developed solid electrolytic capacitors using a conductive polymer compound such as polypyrrole or polythiophen as solid electrolyte. As compared with the conventional solid electrolyte in the form of a metal oxide semiconductor such as manganese dioxide, the solid electrolyte in the form of the conductive polymer compound has a lower resistivity value of 0.01 $\omega \cdot cm$ to 0.1 $\omega \cdot cm$ while a resistivity value ($\rho$) of a used electrolyte is inversely proportional to a frequency. Therefore, the solid electrolytic capacitor using the conductive polymer compound having the small resistivity value as the solid electrolyte is widely used because the impedance value in a high frequency region can be suppressed to a lower value.

As one example of an aluminum solid electrolytic capacitor using a conductive polymer compound as a solid electrolyte, a flat-plate element structure will be described. An anodic oxide film layer is formed on the surface of a belt-shaped aluminum foil surface-roughened by etching or the like and an insulating resin body is formed at a predetermined portion for dividing into an anode portion and a cathode portion. Thereafter, a conductive polymer film is formed at a predetermined portion and then a graphite layer and a silver paste layer are formed on the conductive polymer film in the order named, thereby forming the cathode portion. Thereafter, this element cathode portion and an external cathode terminal are connected together by the use of silver paste. Since the anode portion divided by the insulating resin body is in the form of the aluminum foil which is unsolderable, a solderable metal plate is electrically connected thereto by ultrasonic welding, electric resistance welding, laser welding, or the like.

The foregoing silver paste layer formed on the conductive polymer film contains epoxy resin, phenol resin, or the like for providing curing and adhesive properties. As a result, there is a disadvantage in that the conductivity of the silver paste layer decreases to $\frac{1}{10}$ to $\frac{1}{100}$ of that of pure silver. Further, as described above, since the aluminum foil at the anode portion is unsolderable, it is necessary to electrically connect a solderable metal of a different kind by the foregoing method or the like.

Therefore, the process is complicated and, in order to achieve reduction in impedance and reduction in thickness, a totally new method invention is necessary in terms of the silver paste layer, the connection method for the metal of the different kind connected to the anode portion, and the like.

Further, in order to achieve a small-size, large-capacity, and low-impedance capacitor which is mounted on a board with a limited floor area, a stacked structure is required as described in Japanese Unexamined Patent Application Publication (JP-A) 2001-358039. However, it has become difficult to achieve reduction in impedance by the use of the conventional silver paste or metal plate due to the influence of reduction in thickness and conductivity.

Recently, as described in Japanese Unexamined Patent Application Publication (JP-A) 2004-87872, there are a method of implementing metal plating after applying graphite onto a conductive polymer film at a cathode portion and a method of implementing metal plating after forming a deposition film of noble metal on a conductive polymer film at a cathode portion. However, these methods each also generate an interfacial resistance in a pretreatment at the cathode portion, increase the thickness of a capacitor, and require more process steps and cost.

SUMMARY OF THE INVENTION

It is therefore an object of this invention to provide a solid electrolytic capacitor requiring only a small space while having a large capacity and a low impedance.

It is another object of this invention to provide a stacked capacitor using solid electrolytic capacitors each requiring only a small space while having a large capacity and a low impedance.

It is still another object of this invention to provide a fabrication method of such a stacked capacitor.

According to one aspect of the present invention, there is provided a solid electrolytic capacitor which comprises an anodic oxide film formed on a first predetermined portion or an entire surface containing the first predetermined surface of a surface-roughened aluminum base body, a solid electrolyte in the form of a conductive polymer film formed at the first predetermined portion on the anodic oxide film, a cathode portion having a first metal plating layer formed on the conductive polymer film, an anode terminal portion having a second metal plating layer formed in the order named at a second predetermined portion other than the predetermined portion of the surface of the aluminum base body, and third metal plating layers respectively formed on the first metal plating layer and the second metal plating layer that are respectively formed at the cathode portion and the anode terminal portion.

According to another aspect of the present invention, there is provided a stacked solid electrolytic capacitor formed by stacking a plurality of solid electrolytic capacitors each is above-described. In the aspect of the present invention, the plurality of solid electrolytic capacitors are joined together by fusing an alloy layer of each of the third metal plating layers.

According to still another aspect of the present invention, there is a stacked capacitor in the form of a plurality of solid electrolytic capacitors stacked together. Each of the plurality of solid electrolytic capacitors comprises an anodic oxide film formed on a predetermined portion or an entire surface containing the predetermined portion of a surface-roughened aluminum base body, a solid electrolyte in the form of a conductive polymer film formed at a predetermined portion on the anodic oxide film, a cathode portion having a first metal plating layer formed on the conductive polymer film, an anode terminal portion having a second metal plating layer formed in the order named at a second predetermined portion other than the first predetermined portion of the aluminum base body, and conductor layers respectively formed on the first metal plating layer and the second metal plating layer that are respectively formed at the cathode portion and the anode terminal portion. In the aspect of the present invention, the plurality of solid electrolytic capacitors are joined together by the use of conductive paste as the conductor layers after formation of the first metal plating layer and the second metal plating layer.

According to yet another aspect of the present invention, there is provided a method of fabricating a stacked capacitor by stacking together a plurality of the solid electrolytic capacitors above described. The method comprises the steps of cutting an aluminum chemical conversion foil into a predetermined shape to form an aluminum frame, forming a plurality of solid electrolytic capacitor elements on the frame, stacking a plurality of the frames at predetermined positions, fixing the stacked plurality of frames by heating to fuse copper-tin alloy plating layers, and cutting the fixed plurality of frames at predetermined portions, thereby forming the stacked capacitor.

According to a further aspect of the present invention, there is provided a method of fabricating a stacked capacitor in the form of a plurality of solid electrolytic capacitors stacked together. The method comprises the steps of cutting an aluminum chemical conversion foil into a predetermined shape to form an aluminum frame, forming an anodic oxide film on a first predetermined portion or an enter surface containing of the first predetermined portion of the aluminum frame, forming a solid electrolyte in the form of a conductive polymer film at the first predetermined portion on the anodic oxide film, forming a cathode portion to have a first metal plating layer on the conductive polymer film, forming an anode terminal portion to have a second metal plating layer at a second predetermined portion other than the first predetermined portion of the aluminum frame, forming conductor layers respectively formed on the first metal plating layer and the second metal plating layer that are respectively formed at the cathode portion and the anode terminal portion, stacking a plurality of the frames at predetermined positions after formation of the first metal plating layer and the second metal plating layer, joining together the stacked plurality of frames by the use of conductive paste as the conductor layers, and cutting the joined plurality of frames at a predetermined parts to form each of the plurality of solid electrolytic capacitors, thereby forming the stacked capacitor.

DESCRIPTION OF THE PREFERRED EMBODIMENTS

In order to facilitate understanding of this invention, a conventional solid electrolytic capacitor and stacked capacitor will be described with reference to the drawings prior to describing embodiments of this invention.

Figure 1:
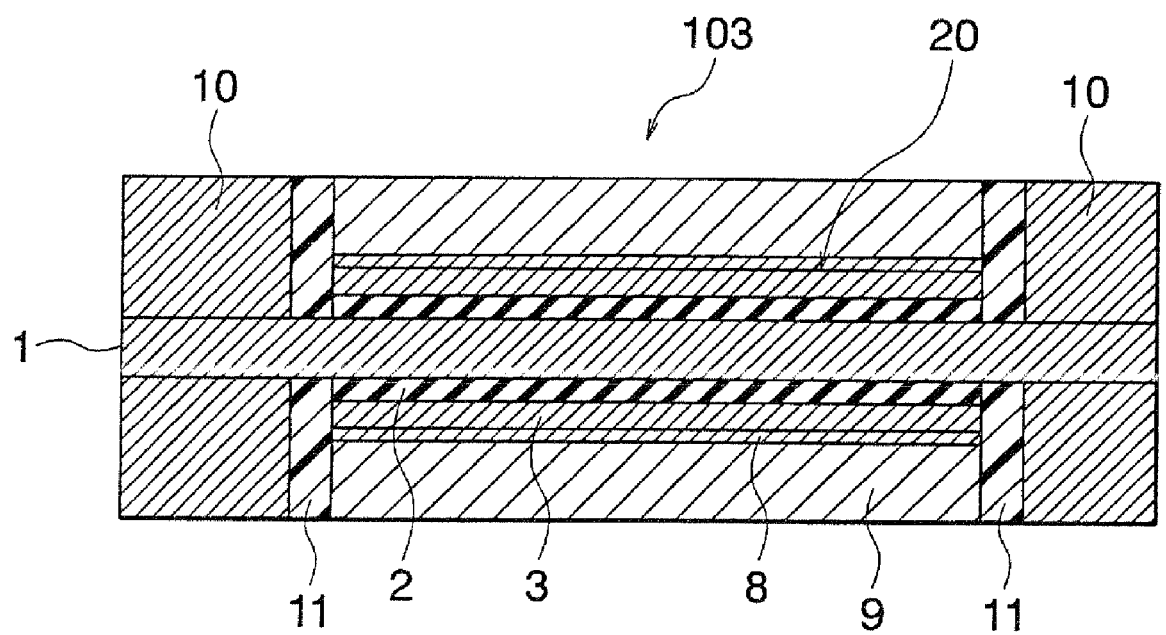
FIG. 1 is a sectional view of a conventional aluminum solid electrolytic capacitor.

Referring to FIG. 1, in fabrication of a conventional solid electrolytic capacitor 103, there is obtained a chemical conversion foil composed of a surface-roughened aluminum foil 1 having a predetermined shape and an aluminum oxide film 2 formed on the surface of the aluminum foil 1 by anodic oxidation. This chemical conversion foil is cut into a predetermined shape to thereby form an aluminum frame and then a conductive polymer film is formed on the aluminum frame at portions where a plurality of solid electrolytic capacitor elements will be formed, thereby obtaining a basic element 20. On a conductive polymer layer 3 in the form of the conductive polymer film of the basic element 20 is formed a graphite layer 8 in the form of a carbon-deposition film and then a conductive paste layer 9 is formed on the graphite layer 8. Further, at an anode portion, conductive metal is directly welded thereto or a solder layer is formed after plating, thereby forming an anode terminal portion 10.

Figure 2:
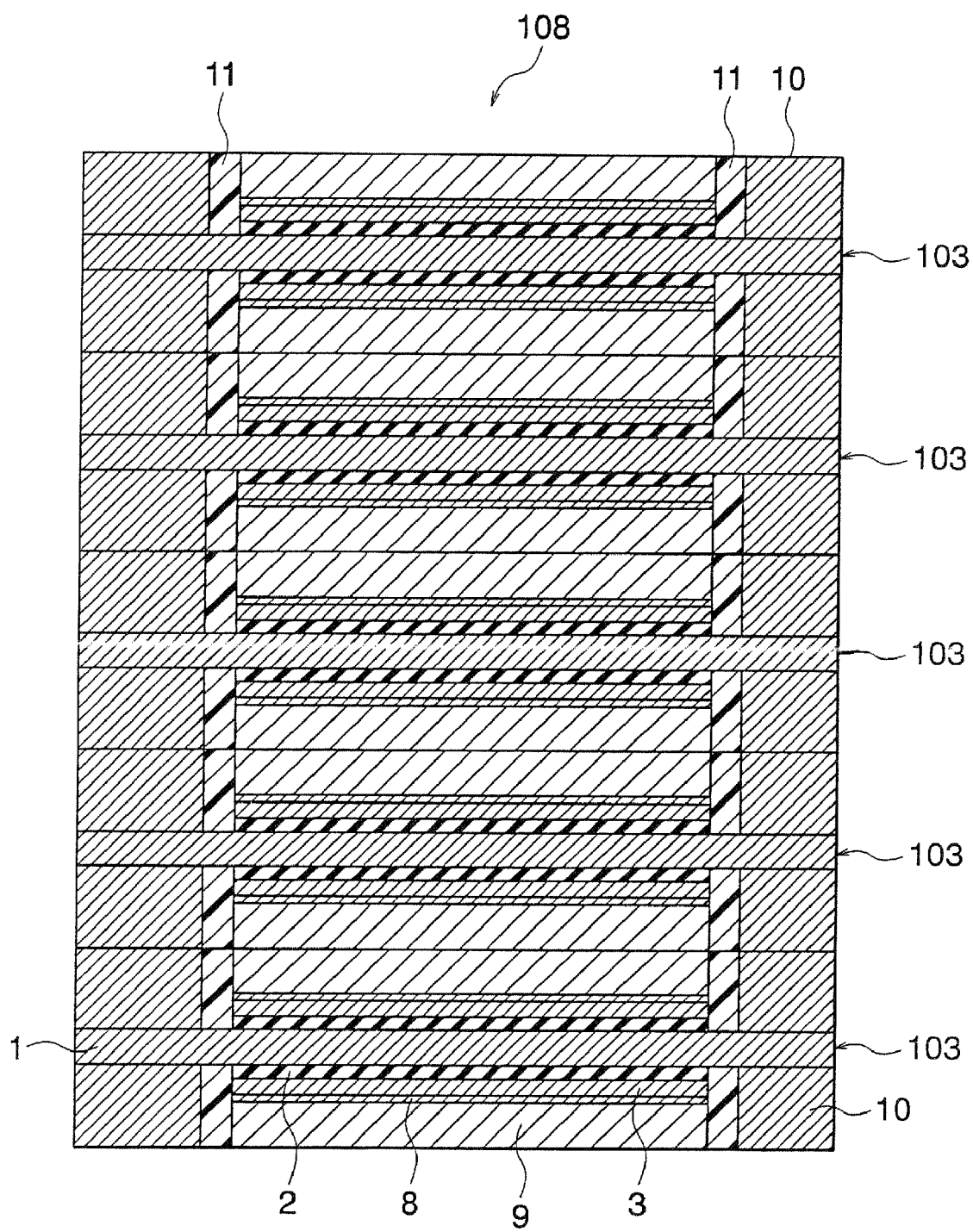
FIG. 2 is a sectional view of a conventional stacked capacitor.

Referring to FIG. 2, a conventional stacked capacitor 108 has a structure in which a plurality of solid electrolytic capacitors 103 are stacked together and, in the illustrated example, has a five-layer structure.

Referring to FIGS. 3 to 11C, the embodiments of this invention will be described.

Figure 11A:
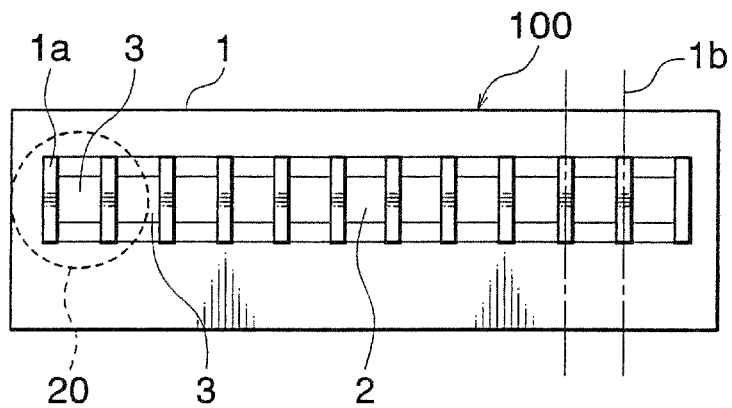
FIGS. 11A through 11C are schematic views for use in explaining a process of manufacturing the stacked capacitor according to one example of the present invention.
Figure 11B:
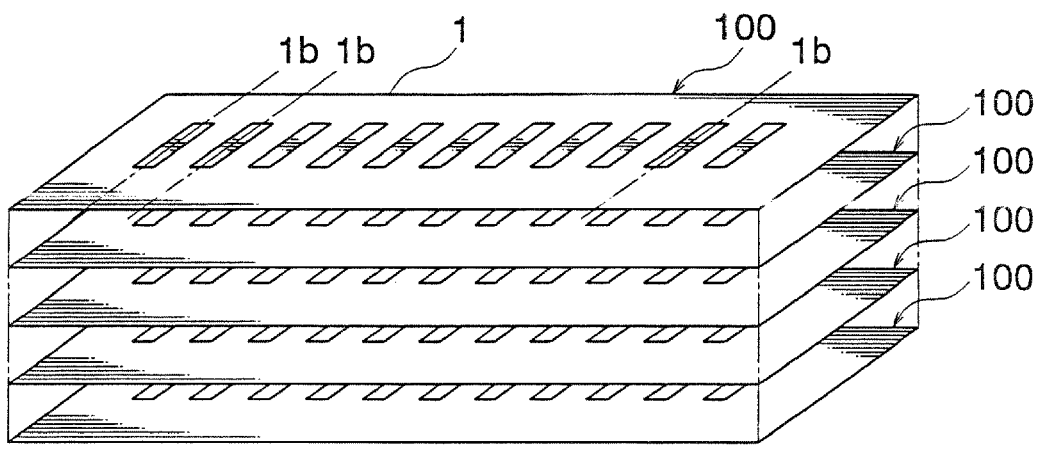
Figure 11C:
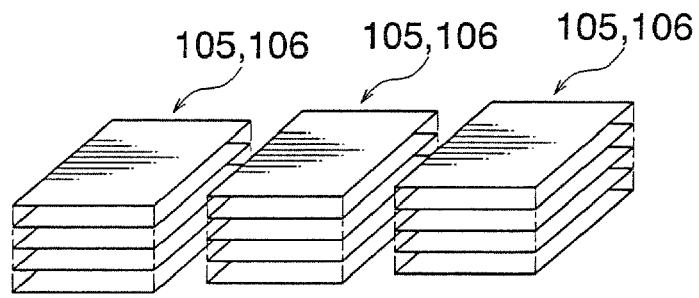

In FIG. 11A, there is obtained a chemical conversion foil composed of a surface-roughened aluminum foil 1 having a predetermined shape and an aluminum oxide film 2 formed on the surface of the aluminum foil 1 by anodic oxidation. Herein, reference numeral "1a" represents a punch out hole, which will be a guide for cutting along a cutting line 1b. This chemical conversion foil is cut into a predetermined shape to thereby form an aluminum frame and then a conductive polymer film is formed on the aluminum frame at portions where a plurality of solid electrolytic capacitor will be formed, thereby obtaining a basic element 20. Metal plating such as copper plating or nickel plating is directly applied to a conductive polymer layer 3 in the form of the conductive polymer film of the basic element 20 to thereby form a first metal plating layer (I). Then, after forming a deposition layer 4 on the anodic oxide film 2 or after polishing this anodic oxide film 2, a second metal plating layer (II) composed of a single layer or a plurality of layers is formed at this anode portion. Thereafter, a third metal plating layer (III) 7 formed by copper-tin alloy plating using an alloy of copper and tin is formed on the outermost surface layers. Then, as shown in FIG. 11B, a predetermined number of the frames 100 each having the foregoing structure are stacked at predetermined positions, then fixed together by heating to fuse the copper-tin alloy plating layers, then cut at predetermined portions which are represented by the cutting lines 1b parallel to each other, thereby producing stacked solid electrolytic capacitors (each being a stacked capacitor 105 or 106) shown in FIG. 1C.

Specifically, after forming the conductive polymer layer 3 at the aluminum frame cathode portion, the anode portion is subjected to masking by the use of a resist 11 or the like. Thereafter, the aluminum frame with the conductive polymer layer 3 and the masked anode portion is immersed in a copper sulfate electroplating liquid or a nickel electroplating liquid manufactured by, for example, Uyemura & Co., Ltd. Herein, the copper sulfate electroplating liquid is an aqueous solution containing sulfuric acid, copper sulfate, hydrochloric acid, and an additive (THRU-CUP EPL), while the nickel electroplating liquid is an aqueous solution containing nickel sulfate, nickel chloride, and boric acid.

Then, using the aluminum frame as a cathode and a copper or nickel plate as an anode, a voltage of 0.1V to 10V is applied for 1 to 120 minutes and, after cleaning and drying to form a metal plating film, these processes are repeated for 1 to 10 cycles until the thickness of the film reaches 1 to 20 µm for blocking oxygen. Subsequently, the frame with the metal plating film is immersed in a lead-free copper-tin alloy plating liquid manufactured by, for example, Uyemura & Co., Ltd. Herein, the lead-free copper-tin alloy plating liquid is an aqueous solution containing $Sn^{2+}$, $Cu^{2+}$, and free acid. Then, using the aluminum frame as a cathode and a tin plate as an anode, a voltage of 0.1V to 20V is applied for 1 to 60 minutes to thereby obtain a copper-tin alloy plating film.

As compared with the conventional graphite or silver paste having a conductivity of $1.0 \times 10^2$ to $10^4$ S/cm or $1.54 \times 10^4$ S/cm, each of the foregoing copper plating film and copper-tin alloy plating film at the cathode portion has a higher conductivity of 0.9 to $5.6 \times 10^5$ S/cm. Therefore, in terms of conductivity $\sigma = 1/\rho$ (resistivity) and $R = \rho \cdot 1/S$, it is considered that lower impedance characteristics can be obtained. In addition, the copper plating film and copper-tin alloy plating film can be formed thinner than a silver paste film.

Description will be given below about a method of Cu plating, at the anode portion, onto the aluminum metal base body or the dielectric oxide film 2 formed on the surface thereof.

After forming the foregoing copper-tin alloy plating layer at the cathode portion, the cathode portion is subjected to masking by the use of a resist 11 or the like. Then, noble metal such as gold, platinum, or silver, or carbon is deposited to form an anode deposition film 4 at the anode portion. Alternatively, it may be arranged that, in the process of forming the anodic oxide film 2 on the aluminum foil which is surface-roughened by etching or the like, masking is partially applied by the use of the resist 11 so as not to form the oxide film 2 at the anode portion, that the anodic oxide film 2 is polished at the anode portion, or that, as a zincate process, after masking the cathode portion, the anode portion formed with the oxide film 2 is immersed in a strong acid such as nitric acid or sulfuric acid for 10 to 300 seconds, then well washed and, after immersing it in a zincate treatment liquid for 10 to 300 seconds, it is well washed and dried to thereby remove the oxide film. In the zincate process, immersion, washing, and drying may be repeated several times to achieve a better effect. Then, the anode portion where the anode deposition film 4 is formed or the oxide film 2 is not formed is immersed in the foregoing copper sulfate electroplating liquid or nickel electroplating liquid to form a second metal plating layer (II) by copper or nickel plating like at the cathode portion. Further, a copper-tin alloy plating layer is also formed like at the cathode portion.

There is another method wherein the first metal plating layer (I) at the cathode portion is made of copper or nickel, or obtained by first forming a nickel film and then forming a copper film thereon, the second metal plating layer (II) at the anode portion is made of copper or nickel, or obtained by first forming a nickel film and then forming a copper film thereon and, after forming the second metal plating layer (II), third metal plating layers (III) of copper-tin alloy plating are formed simultaneously at the cathode and anode portions.

After the formation of the third metal plating layers (III), the frame is cut into capacitor elements of a predetermined size, then the elements are stacked together, and then the copper-tin alloy plating layers at the anode and cathode portions are melted and welded together at 230° C. to 350° C., thereby forming an intended large-capacity low-impedance stacked aluminum electrolytic capacitor (stacked capacitor 105 or 106).

There is also a method of forming a stacked aluminum electrolytic capacitor by bonding the capacitor elements by the use of conductive paste 9 after the formation of the third metal plating layers (III). The aluminum solid electrolytic capacitor obtained by such a method is a capacitor featured by improvement in contact with solder and reduction in thickness which have been the objects to be achieved.

As described above, according to this invention, since the metal plating layer is directly provided on the conductive polymer film at the cathode portion of the solid electrolytic capacitor element, there is an effect of reduction in thickness and reduction in impedance as extraction electrodes having a high conductivity. Further, by providing the copper plating or the copper-tin alloy plating on the metal plating layer, the stacked solid electrolytic capacitor can be formed using only the metals having high conductivities. This makes it possible to provide an aluminum solid electrolytic capacitor requiring only a small space while having a large capacity and a low impedance.

Hereinbelow, specific examples of this invention will be described in detail with reference to the drawings.

Figure 3:
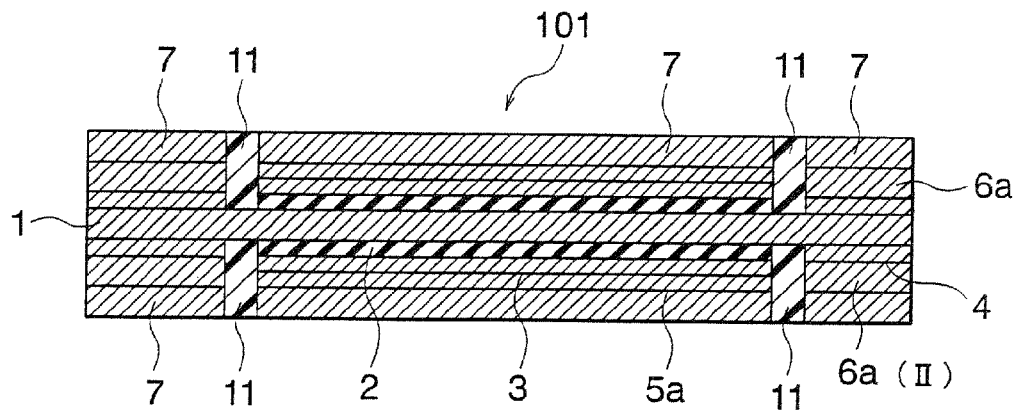
FIG. 3 is a sectional view showing components of an aluminum solid electrolytic capacitor applied with copper plating and copper-tin alloy plating according to a first embodiment of this invention.
Figure 4:
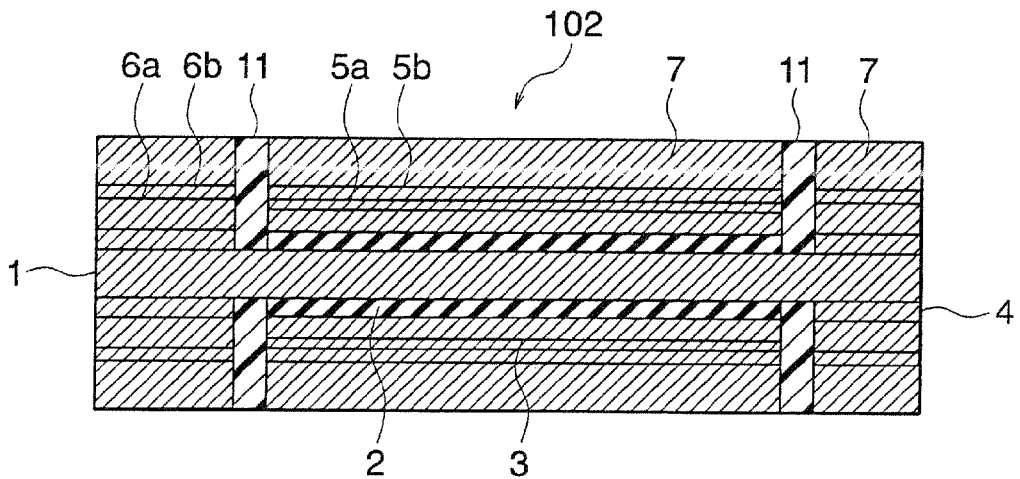
FIG. 4 is a sectional view showing components of an aluminum solid electrolytic capacitor applied with nickel plating, copper plating, and copper-tin alloy plating according to a second embodiment of this invention.
Figure 5:
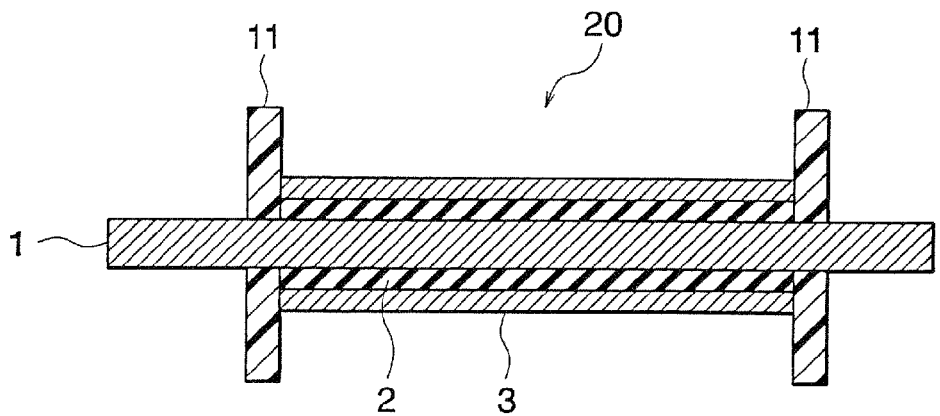
FIG. 5 is a sectional view showing a basic structure of an element (basic element) having an aluminum metal base body, a dielectric aluminum oxide film formed thereon, and a conductive polymer layer, serving as a solid electrolyte, formed on the dielectric aluminum oxide film.

That is, each example of this invention shows an element structure change from FIG. 5 to FIG. 3 or FIG. 4 and a forming method thereof.

Hereinbelow, fabrication examples where copper plating, nickel plating, and copper-tin alloy plating are used for the first, second, and third metal plating layers (I), (II), and (III) will be described with reference to the drawings.

EXAMPLE 1

In a basic element 20 shown in FIG. 5, a conductive polymer layer 3 in the form of a conductive polymer film is formed on a dielectric oxide film 2 of an aluminum foil 1 formed with the dielectric oxide film 2 by surface roughening. Symbol 11 denotes a resist for dividing into an anode portion and a cathode portion. In the basic element 20 after the formation of the conductive polymer film, a copper plating layer was directly formed as a first metal plating layer (I) 5a on the cathode portion conductive polymer layer 3 as shown in FIG. 3. Alternatively, after forming a graphite layer on the cathode portion conductive polymer layer 3, a copper plating layer was formed as a first metal plating layer (I) 5a. Then, the respective samples were each applied, as a pretreatment for anode portion copper plating, with a zincate treatment, with gold deposition, platinum deposition, or carbon deposition to form an anode deposition film 4, with masking so as not to form the oxide film at the anode portion, or with polishing of the oxide film at the anode portion, and then the copper plating was applied to each sample at the same application voltage for the same voltage application time to thereby form a second metal plating layer (II) 6a. Thereafter, with respect to each of aluminum solid electrolytic capacitors applied with plating of a copper-tin alloy having a melting point of about 230° C. to 350° C., the capacity at 120 Hz, the ESR at 1 kHz, and the ESR at 100 kHz were measured. The results are shown in Tables 1 and 2 given below.

As shown in FIG. 4, a nickel plating layer was formed as a first layer 5a of a first metal plating layer (I) on a basic element 20 and a copper plating layer was formed as a second layer 5b on the first layer 5a, while, likewise, a nickel plating layer was formed as a first layer 6a of a second metal plating layer (II) and a copper plating layer was formed as a second layer 6b on the first layer 6a, and third metal plating layers (III) 7 were each formed by a copper-tin alloy plating layer, thereby preparing a solid electrolytic capacitor 102.

Figure 6:
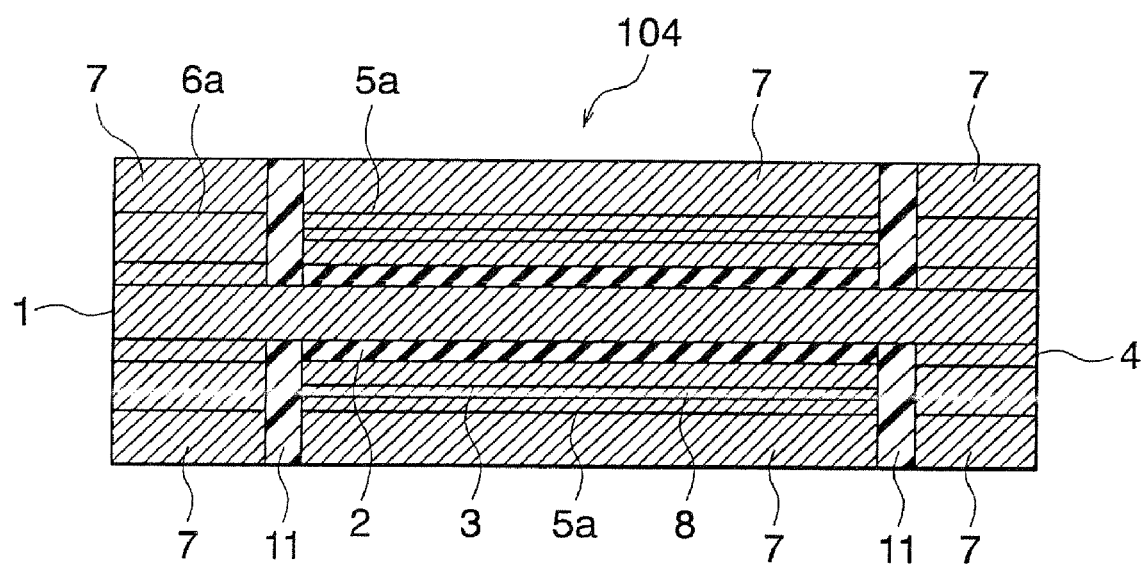
FIG. 6 is a sectional view of an aluminum solid electrolytic capacitor according to a third embodiment of this invention.

As shown in FIG. 6, a graphite layer 8 was formed on a polypyrrole layer 3, a copper plating layer was formed thereon as a first metal plating layer (I) 5a, a copper plating layer was formed as a second metal plating layer (II) 6a on an anode deposition film 4 at the anode portion, and third metal plating layers (III) 7 were each formed by a copper-tin alloy plating layer, thereby preparing a solid electrolytic capacitor 104.

As shown in FIG. 1, a conductive polymer layer 3 at the cathode portion was made of polypyrrole and an external extraction electrode was formed by a graphite layer 8 and a conductive paste layer 9 made of Ag paste, thereby preparing a solid electrolytic capacitor element 103.

Figure 7:
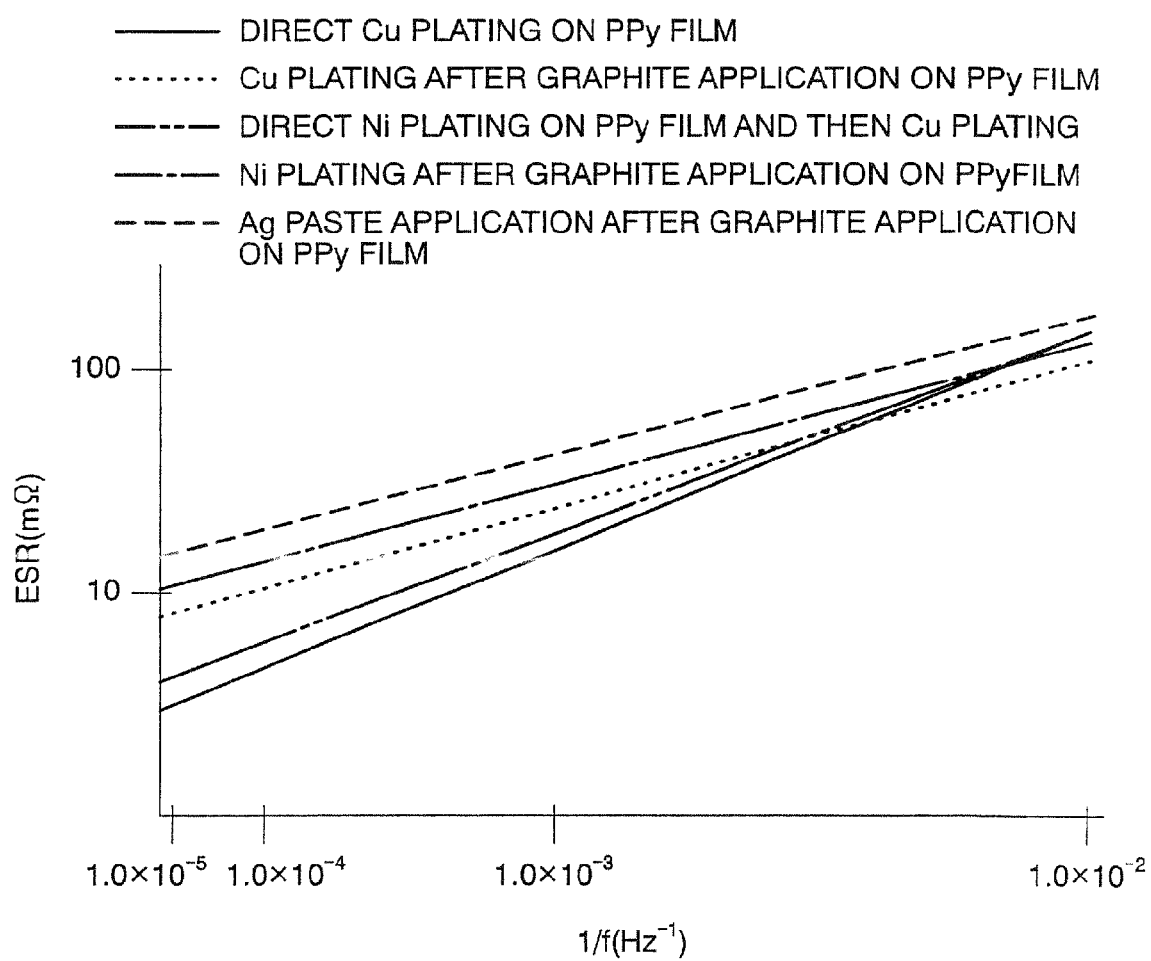
FIG. 7 is a diagram showing ESR characteristics of aluminum solid electrolytic capacitors.

With respect to the elements 101, 102, 103, and 104, the frequency characteristics of ESR were measured, respectively. The results are shown in FIG. 7.

TABLE 1

Anode Pretreatment and Characteristics in Case of Direct Copper Plating on Polypyrrole at Cathode Portion

| | Under Plating Direct Cu Plating on PPy Film | | | | | |
|---|---|---|---|---|---|---|
| Pre-treatment | Au Deposition | Pt Deposition | C Deposition | Zi Treatment Oxide Film Removal | Masking No Oxide Film | Anode Oxide Film Polishing |
| 120 Hz Cap (µF) | 25.5 | 25.3 | 26.2 | 24.9 | 25.1 | 25.0 |
| 1 kHz ESR (mΩ) | 120 | 102 | 107 | 125 | 95 | 97 |
| 100 kHz ESR (mΩ) | 6.8 | 5.9 | 4.2 | 7.2 | 6.0 | 6.2 |

TABLE 2

Anode Pretreatment and Characteristics in Case of Copper Plating after Graphite Application at Cathode Portion

| | Under Plating Cu Plating after Graphite Application | | | | | | |
|---|---|---|---|---|---|---|---|
| Pre-treatment | Au Deposition | Pt Deposition | C Deposition | Zi Treatment Oxide Film Removal | Masking Oxide Film Removal | Anode Oxide Film Polishing | Conventional Ag Paste & Anode Terminal |
| 120 Hz Cap (µF) | 25.5 | 26.3 | 25.5 | 26 | 25.5 | 25.3 | 23.6 |
| 1 kHz ESR (mΩ) | 97 | 96 | 112 | 109 | 90 | 93 | 254 |
| 100 kHz ESR (mΩ) | 14.8 | 14.7 | 17.2 | 15.6 | 14.5 | 15 | 18.0 |

EXAMPLE 2

As shown in FIG. 3, a first metal plating layer (I) 5a on polypyrrole and a second metal plating layer (II) 6a on a metal deposition layer 4 were formed by copper plating, respectively, according to the foregoing copper plating method and third metal plating layers (III) 7 were each formed by a copper-tin alloy plating layer, thereby preparing a solid electrolytic capacitor 101.

EXAMPLE 3

Figure 8:
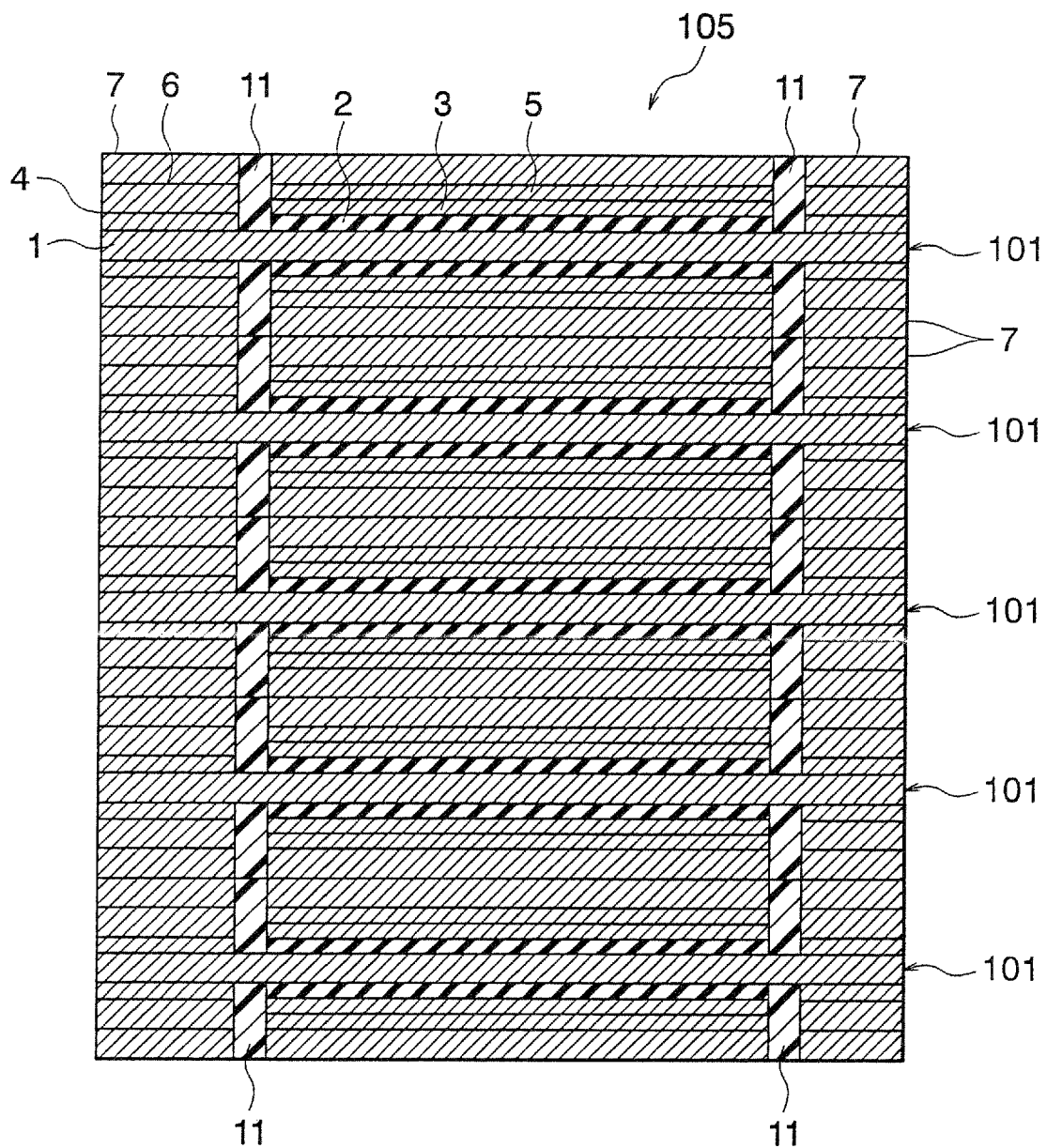
FIG. 8 is a sectional view of a stacked capacitor according to a fourth embodiment of this invention.

After forming a plurality of solid electrolytic capacitors 101 on the frames shown in FIG. 8, the frames were stacked together and then copper-tin alloy plating layers 7 as third metal plating layers (III) 7 were heated and melted at 230° C. to 350° C. so as to be bonded together, thereby producing five-layer stacked capacitors 105 of this invention.

Figure 9:
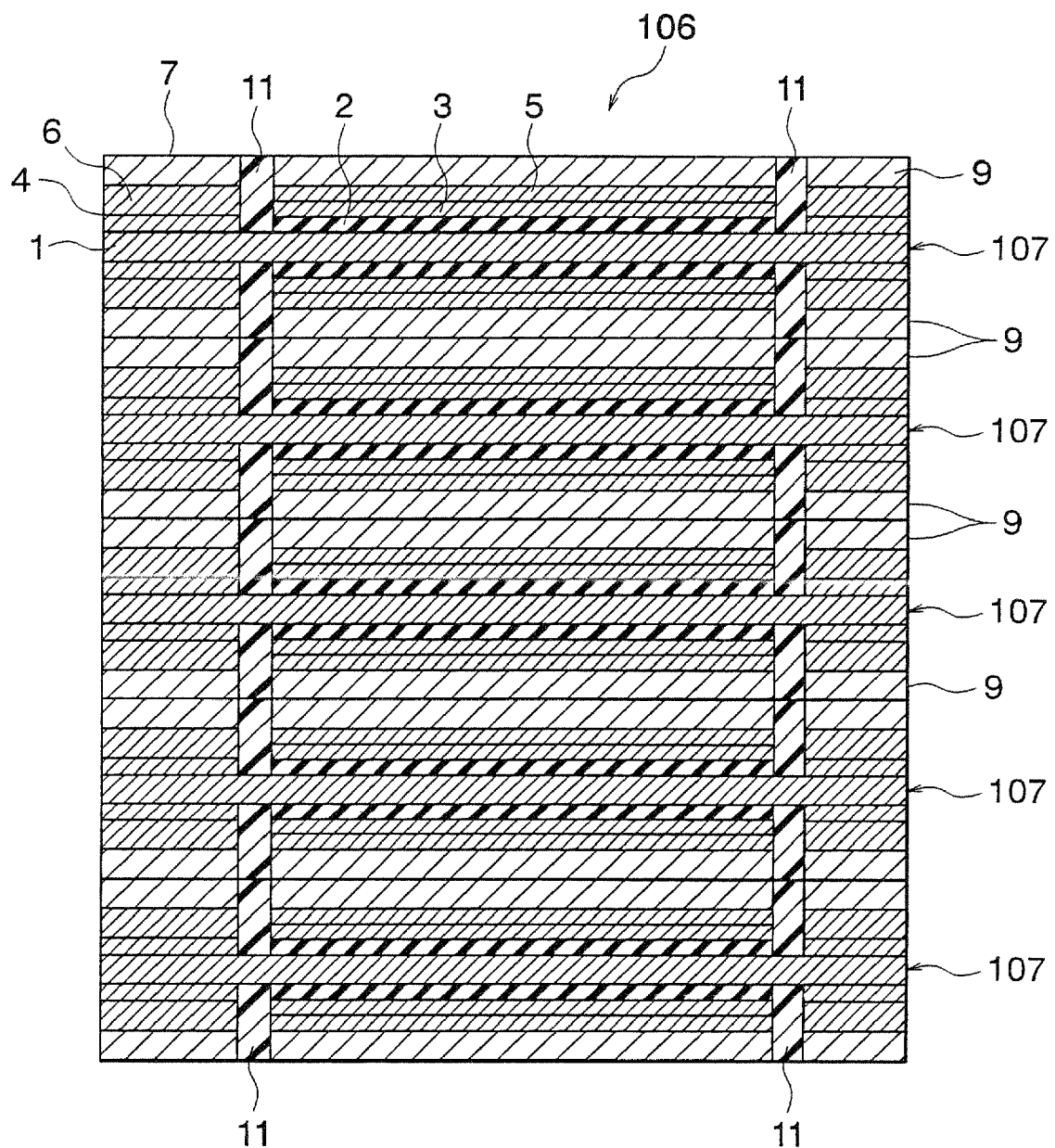
FIG. 9 is a sectional view of a stacked capacitor according to a fifth embodiment of this invention.

Further, the frames shown in FIG. 9 were stacked together at predetermined positions, then solid electrolytic capacitors 107 were joined together by the use of conductive paste and then cut at predetermined portions, thereby producing five-layer stacked capacitors 106.

For comparison, there was produced a conventional five-layer stacked capacitor 108 using graphite, silver paste, and terminal plates as shown in FIG. 2.

Figure 10:
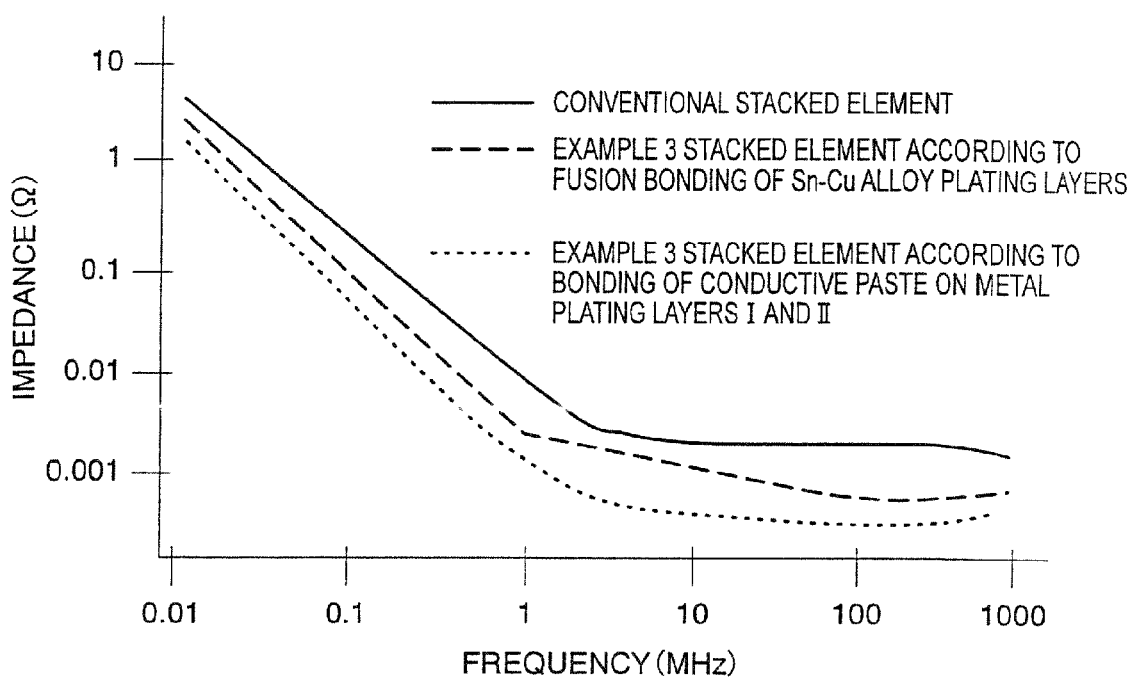
FIG. 10 is a diagram showing frequency characteristics of impedance of stacked capacitors.

FIG. 10 shows frequency-impedance characteristics of the stacked capacitors 105, 106, and 108, respectively.

As shown in FIG. 10, it is understood that the impedance of the stacked capacitor 105 of this invention is lower than that of the stacked capacitor 106 of this invention over the whole frequency range, while the impedance of the stacked capacitor 106 is lower than that of the conventional stacked capacitor 108 over the whole frequency range.

As described above, the aluminum solid electrolytic capacitor and the stacked capacitor according to this invention are each optimal as a capacitor for use in a high-frequency electronic device.

Naturally, the stacked capacitor of this invention can be used in, for example, a decoupling circuit for connection to a power supply of a CPU of a PC, as a line element that uses the anodes on both sides and the cathode at the center as three terminals.

Although the description has been given of the embodiments of this invention, it is readily understood that this invention is not limited to those embodiments and that various changes can be made within the range of spirit and scope of this invention.

What is claimed is:

1. A method comprising:
   forming a plurality of solid electrolytic capacitor elements on a surface-roughened aluminum frame by performing a process comprising:
   forming an anodic oxide film on one of: (i) a first predetermined portion of the aluminum frame, said first predetermined portion including portions of upper and lower surfaces of the aluminum frame, and (ii) an entirety of upper and lower surfaces of the aluminum frame, including the first predetermined portion;
   forming a solid electrolyte, comprising a conductive polymer film, at the first predetermined portion on the anodic oxide film;
   forming, at the first predetermined portion, a first metal plating layer on the conductive polymer film, to form a cathode portion;
   forming a second metal plating layer at a second predetermined portion, other than the first predetermined portion of the aluminum frame, to form an anode portion, said second predetermined portion including portions of upper and lower surfaces of the aluminum frame; and
   forming alloy plating layers on the first metal plating layer at the cathode portion and the second metal plating layer at the anode portion, respectively;
   performing said process of forming the plurality of solid electrolytic capacitors on the surface-roughened aluminum frame for at least one additional surface-roughened aluminum frame, such that a plurality of said frames each having a plurality of said solid electrolytic capacitors thereon are formed;
   stacking the plurality of frames such that the respective alloy plating layers on adjacent frames in the stack abut each other;
   fixing the stacked plurality of frames together by performing heating to fuse the respective alloy plating layers of the adjacent frames; and
   cutting the fixed-together plurality of frames at at least one predetermined position to form at least one stacked capacitor.

2. The method according to claim 1, wherein the alloy layers are copper-tin alloy layers.

3. The method according to claim 2, wherein a melting point of the copper-tin alloy plating layers is 230° C. to 350° C.

4. The method according to claim 1, further comprising forming each said surface-roughened aluminum frame by cutting an aluminum chemical conversion foil into a predetermined shape.

5. The method according to claim 1, wherein each of the first metal plating layer and the second metal plating layer comprises one of: (i) a two-layer structure of a nickel layer and a copper layer, and (ii) a single-layer structure of one of a copper layer and a nickel layer.

6. The method according to claim 1, wherein the first metal plating layer comprises a graphite layer and a copper paste layer.

7. The method according to claim 1, wherein no anodic oxide film is formed on the anode portion.

8. The method according to claim 1, wherein the anodic oxide film is formed on the anode portion of the aluminum frame, and said process of forming the plurality of solid electrolytic capacitor elements on the surface-roughened aluminum frame further comprises removing the anodic oxide film from the anode portion.

9. The method according to claim 1, wherein the anodic oxide film is formed on the anode portion of the aluminum frame, and said process of forming the plurality of solid electrolytic capacitor elements on the surface-roughened aluminum frame further comprises forming an anode deposition film on the anodic oxide film, wherein the second metal plating layer is formed on the anode deposition film.

10. The method according to claim 9, wherein the anode deposition film comprises an inorganic conductive deposition film.

11. The method according to claim 10, wherein the inorganic conductive deposition film is one of: (i) a carbon deposition film, and (ii) a metal deposition film made of one of platinum and gold.

12. The method according to claim 1, wherein the stacked capacitor is used as a line element.

13. A method comprising:
   forming a plurality of solid electrolytic capacitor elements on a surface-roughened aluminum frame by performing a process comprising:
   forming an anodic oxide film on one of: (i) a first predetermined portion of the aluminum frame, said first predetermined portion including portions of upper and lower surfaces of the aluminum frame, and (ii) an entirety of upper and lower surfaces of the aluminum frame, including the first predetermined portion;
   forming a solid electrolyte, comprising a conductive polymer film, at the first predetermined portion on the anodic oxide film;
   forming, at the first predetermined portion, a first metal plating layer on the conductive polymer film, to form a cathode portion;

forming a second metal plating layer at a second predetermined portion other than the first predetermined portion of the aluminum frame, to form an anode portion, said second predetermined portion including portions of upper and lower surfaces of the aluminum frame; and forming conductor layers, which comprise a conductive paste, on the first metal plating layer at the cathode portion and the second metal plating layer at the anode portion, respectively;

performing said process of forming the plurality of solid electrolytic capacitors on the surface-roughened aluminum frame for at least one additional surface-roughened aluminum frame, such that a plurality of said frames each having a plurality of said solid electrolytic capacitors thereon are formed;

stacking the plurality of frames, such that the plurality of stacked frames are joined together by the conductive paste; and cutting the joined plurality of frames at at least one predetermined position to form at least one stacked capacitor.

14. The method according to claim 13, further comprising forming each said surface-roughened aluminum frame by cutting an aluminum chemical conversion foil into a predetermined shape.

15. The method according to claim 13, wherein each of the first metal plating layer and the second metal plating layer comprises one of: (i) a two-layer structure of a nickel layer and a copper layer, and (ii) a single-layer structure of one of a copper layer and a nickel layer.

16. The method according to claim 13, wherein the first metal plating layer comprises a graphite layer and a copper paste layer.

17. The method according to claim 13, wherein no anodic oxide film is formed on the anode portion.

18. The method according to claim 13, wherein the anodic oxide film is formed on the anode portion of the aluminum frame, and said process of forming the plurality of solid electrolytic capacitor elements on the surface-roughened aluminum frame further comprises removing the anodic oxide film from the anode portion.

19. The method according to claim 13, wherein the anodic oxide film is formed on the anode portion of the aluminum frame, and said process of forming the plurality of solid electrolytic capacitor elements on the surface-roughened aluminum frame further comprises forming an anode deposition film on the anodic oxide film, wherein the second metal plating layer is formed on the anode deposition film.

20. The method according to claim 19, wherein the anode deposition film comprises an inorganic conductive deposition film.

21. The method according to claim 20, wherein the inorganic conductive deposition film is one of: (i) a carbon deposition film, and (ii) a metal deposition film made of one of platinum and gold.

22. The method according to claim 13, wherein the stacked capacitor is used as a line element that is mounted on a board.

* * * * *